UNITED STATES PATENT OFFICE.

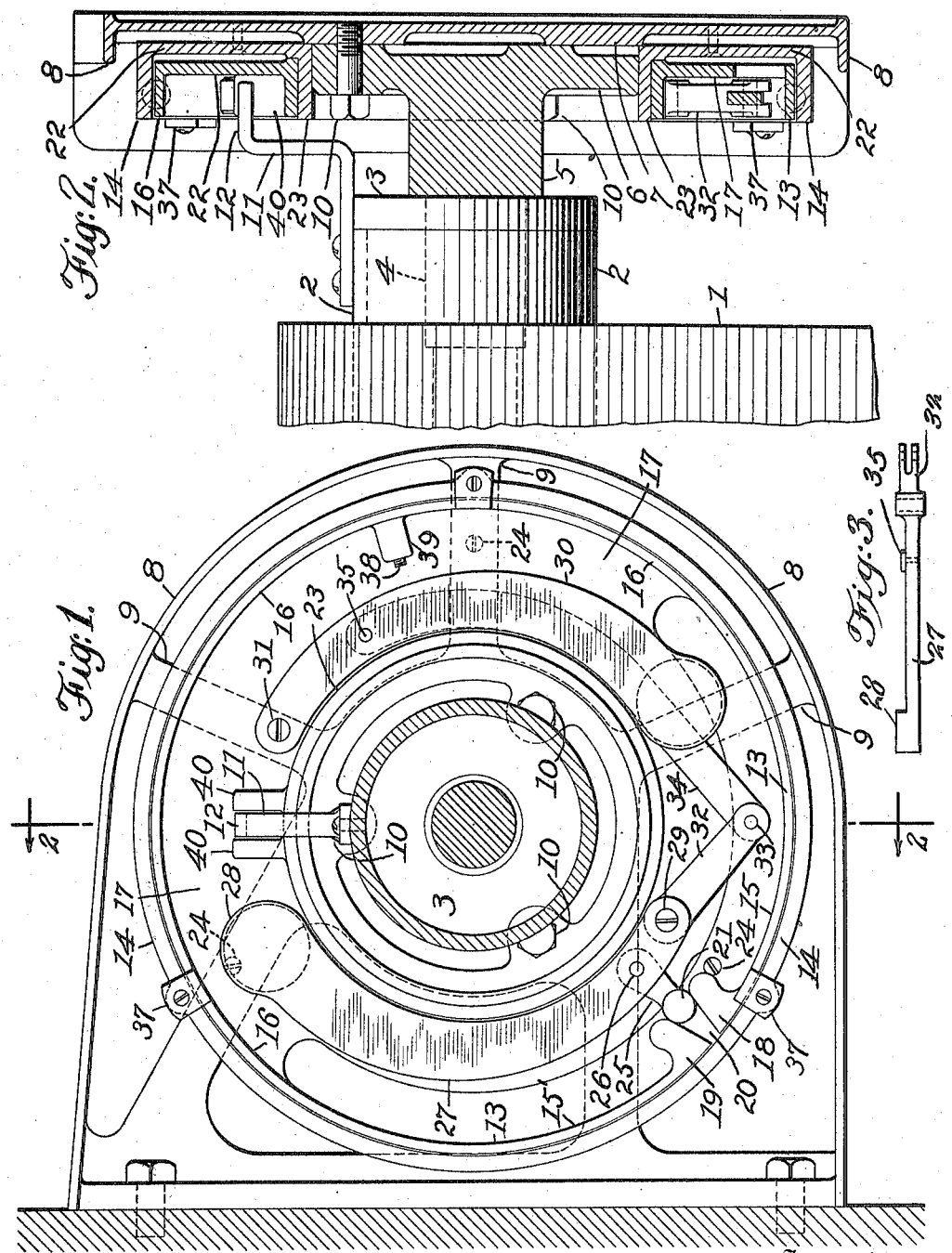

HOWARD A. JOHNSON, OF NORFOLK, VIRGINIA.

CENTRIFUGAL BRAKE.

1,393,289.   Specification of Letters Patent.   Patented Oct. 11, 1921.

Application filed February 16, 1920. Serial No. 359,073.

*To all whom it may concern:*

Be it known that I, HOWARD A. JOHNSON, a citizen of the United States, residing in Norfolk, county of Norfolk, State of Virginia, have invented certain new and useful Improvements in Centrifugal Brakes, of which the following is a full, clear, concise, and exact description.

This invention relates to a centrifugal brake, governor or regulator for use in connection with revolving parts, the speed of which it is desired to maintain substantially uniform. It is particularly intended for use in connection with heavy flexible doors or curtains of steel, wood or other material which are adapted to be rolled or wound on a horizontal cylinder or roller.

The special object of the invention is to produce such a brake or governor that will prevent the too rapid unwinding or descent of a heavy flexible unbalanced door or shutter, which would otherwise move too rapidly and be injured or be dangerous to persons passing thereunder. On the other hand the upward movement of such door or curtain is not retarded and may be easily raised by the usual means for accomplishing that purpose.

For a detailed description of one form of my invention, which I at present deem preferable, reference may be had to the following specification and to the accompanying drawing forming a part thereof, in which—

Figure 1 is a side elevation of my improved centrifugal brake, the central part thereof being shown in section;

Fig. 2 is a diametrical sectional view thereof taken substantially on the line 2—2 of Fig. 1.

Fig. 3 is a detail of one of the centrifugal members illustrated in Figs. 1 and 2.

Referring to the drawings, the numeral 1 indicates a flexible curtain composed of strips of steel, wood or other material which is adapted to be rolled onto and off a suitable roller or cylinder 2, preferably consisting of a steel tube. The end of this cylinder 2 is fitted with a plug or bushing 3, through which the central shaft or axle 4 for the roller passes and on which the bushing 3 is adapted to rotate. The shaft 4 is preferably slightly enlarged as at 5 and terminates in a disk 6, which is secured to the transverse plate 7 forming a part of the housing of the brake. The housing also preferably comprises a guard flange or semi-cylindrical ring 8, which is connected with the plate 7 by suitable spokes or ribs 9. Fastening devices, such as the cap-screws or bolts 10 are provided for securing the disk 6 to the plate 7. These parts form the main support for the curtain roller.

The brake for controlling the same will now be referred to:

On the cylindrical tube or roller 2 is fastened a dog 11 which has a longitudinal portion 12, entering the brake housing and engaging the brake proper to operate the same, when said roller rotates. The brake proper consists primarily of the rotary expansible brake band 13 which contacts frictionally with the stationary brake shoe 14. The brake band 13 is substantially semi-circular and comprises two flexible parts 15 and 15' which form extensions, at diametrically opposite points, of the flange 16 of the annular plate 17. The arms 15 and 15' are provided with two enlargements 18 and 19 which form between them a tapering slot 20 and are adapted to be forced apart to expand the brake band by means of a cylindrical wedge 21. The brake shoe 14 forms the outer portion of a cylindrical drum consisting of the annular plate 22 and an inner flange 23, which plate is fixed to the radial arms or spokes 9 by means of suitable screws 24.

Referring now to the cylindrical wedge 21 as means for operating the expanding brake band 13, it will be noted that said wedge 21 has a transversely extending arm 25 which is pivoted at 26 to an arm 27, curved in the shape of a segment of a circle, which, together with the enlarged end 28, comprises a weight which is acted upon by centrifugal force to move the wedge 21 outward or inward, said arm 27 being pivoted to the disk 17, as at 29. In order to balance the rotating portions of the brake, a second centrifugal weight is provided in the form of a similar segmental arm 30, situated symmetrically with relation to the arm 27, the same being pivoted, as at 31, to the disk 17. In order to cause these two arms or weights 27 and 30 to operate simultaneously, and with equal motion, the arm 27 is provided with a rearwardly extending projection 32, having pivoted to its outer end, as at 33, a link or connecting bar 34, the other end of which is pivoted at 35 to the arm 30. By this arrangement it will be seen that as the arm 27 moves outward, the arm 30 will also be caused to move outward simultaneously and to the same extent, thus adding the weight of said arm 30 to that of the arm 27 so that the action of the wedge 21 is thereby reinforced and the parts balanced. The brake band 13 and the flange 16 forming the connecting portion thereof, are retained in position within the brake shoe 14 by means of the ears or dogs 37 attached to the flange 14 of the brake shoe in any suitable manner. The outward motion of the arm 30 and consequently the arm 27, is limited by means of the headless screw 38, carried in the screw-threaded boss 39 on the flange 16, the screw being adjustable to fix the outer limit at the point desired. The expansible brake band 14, the disk 17 and the flanges 31 and 23 are rotated by the dog 12, before referred to. The connection between said dog 12 and the said parts is accomplished by means of two lugs 40, carried by the flange 23, between which lugs is formed a slot into which the end of the dog 12 projects. Thus is will be seen that the rotation of the tube 2 causes the said brake band and centrifugal arms, wedge and connecting parts to move simultaneously therewith.

The operation of the brake will be readily appreciated by one skilled in the art. The speed of rotation of the weighted segmental arms 27 and 30 about the axis of the shaft, tends to throw the same outward, thereby causing the wedge to expand the brake band and produce a retarding action by frictional contact with the brake shoe 14. The limiting speed of rotation of these parts is readily determined by the weight of the arms, the position of the screw 38, and the relative areas of the contacting parts of the brake, which produce the frictional drag.

Having thus described this form of my invention, I do not wish to be understood as being limited to the details of form and the arrangement of parts above described and illustrated, for various changes may be made therein by those skilled in the art without departing from the spirit and scope of my invention.

What I claim and desire to protect by Letters Patent is:

1. In a centrifugal brake or governor, a flanged disk having a portion of the flange detached from said disk and divided transversely thereby forming flexible parts of a brake-band, and means for separating said parts to expand said band.

2. In a centrifugal brake or governor, a flanged disk, having a portion of the flange detached from said disk and divided transversely thereby forming a brake-band, said divided portion having enlarged ends forming a tapering slot, and a wedge engaging said ends to expand said band.

3. In a centrifugal brake or governor, a flanged disk, having a portion of the flange detached from said disk and divided transversely thereby forming a brake-band, pivoted weights carried on said disk, and means connecting said weights and said band to expand the latter.

4. In a centrifugal brake or governor, a flanged disk having a portion of the flange detached from said disk and divided transversely, thereby forming a brake-band, pivoted weights carried on said disk, a wedge engaging the ends of said band, said wedge being pivoted on one of said weights to expand said band by outward movement of said weights.

5. A centrifugal brake or governor, comprising, a housing adapted to be fixed to a suitable support and having a transverse plate, a bearing fixed to said plate, a roller journaled on said bearing, a drum fixed to said plate and provided with outer and inner flanges, a brake-band contacting with one of said flanges, an annular support for said band, pivoted weights on said support, means connecting said weights with said band to actuate the same, and a part connecting said roller and said support to rotate the latter.

6. A centrifugal brake or governor, comprising a housing adapted to be fixed to a suitable support and having a transverse plate, a disk fixed to said plate, a bearing on said disk, a roller journaled on said bearing, a drum surrounding said disk and fixed to said plate and provided with outer and inner flanges, a brake-band contacting with the outer flange thereof, an annular support for said band comprising inner and outer flanges, said brake-band forming portions of the outer flange, pivoted weights on said support, means connecting said weights with said band to expand the same, and a dog carried by said roller and engaging said support to rotate the same.

7. A combined journal and brake apparatus comprising in combination a fixed shaft coaxial with the part to be braked, a fixed annular member surrounding said shaft, a rotatable annular member carried in said fixed annular member, said rotatable annular member having a part adapted to act as a brake against said fixed annular member, means adapted to cause a braking action between said annular members upon rotation of the inner one, and means whereby said inner member may be driven from the part to be braked.

8. A combined journal and brake apparatus a flat faced support, a shaft having a disk fixed thereon at one end, said disk being removably secured to said flat face, an annular member carried on said disk, a centrifugal brake, means rotatably mounted in said annular member, a member to be braked journaled on said shaft, and a driving connection between said last mentioned member, and said brake means.

HOWARD A. JOHNSON.